(12) United States Patent
Dalrymple et al.

(10) Patent No.: US 10,830,667 B1
(45) Date of Patent: Nov. 10, 2020

(54) OPTICAL AND FUNCTIONAL METROLOGY OF MICROSTRUCTURED OPTICAL FIBERS

(71) Applicant: Magic Leap, Inc., Plantation, FL (US)

(72) Inventors: Timothy Mark Dalrymple, Gainesville, FL (US); Andrew C. Duenner, Houston, TX (US); Mark Schmitt, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/414,570

(22) Filed: May 16, 2019

Related U.S. Application Data

(60) Provisional application No. 62/672,290, filed on May 16, 2018.

(51) Int. Cl.
| | |
|---|---|
| *G01N 21/00* | (2006.01) |
| *G01M 11/00* | (2006.01) |
| *B29D 11/00* | (2006.01) |
| *C03B 37/025* | (2006.01) |
| *G02B 21/36* | (2006.01) |

(52) U.S. Cl.
CPC ....... *G01M 11/30* (2013.01); *B29D 11/00721* (2013.01); *C03B 37/0253* (2013.01); *G02B 21/365* (2013.01)

(58) Field of Classification Search
CPC .......... G01M 11/3145; G01M 11/335; G01M 11/33; G01M 11/3109; G01M 11/338
USPC ....................................................... 356/73.1
See application file for complete search history.

(56) References Cited

U.S. PATENT DOCUMENTS

| | | | |
|---|---|---|---|
| 2004/0227952 A1* | 11/2004 | Jasapara | ............. C03B 37/0253 356/479 |
| 2005/0157312 A1* | 7/2005 | Bachim | ................ G01N 21/412 356/517 |
| 2015/0268415 A1 | 9/2015 | Schowengerdt et al. | |
| 2018/0180875 A1 | 6/2018 | Dalrymple et al. | |

* cited by examiner

*Primary Examiner* — Md M Rahman
(74) *Attorney, Agent, or Firm* — Kilpatrick Townsend & Stockton LLP

(57) ABSTRACT

Described are systems and techniques for characterizing optical fibers. Disclosed systems and techniques employ optical metrology, functional metrology, or both to characterize microstructured optical fibers and determine fiber characteristics, errors, and quality control metrics. The characteristics, errors, and quality control metrics are useful for improving the manufacturing of optical fibers.

20 Claims, 8 Drawing Sheets

OPTICAL AND FUNCTIONAL METROLOGY OF MICROSTRUCTURED OPTICAL FIBERS

CROSS-REFERENCES TO RELATED APPLICATIONS

This application claims the benefit of and priority to U.S. Provisional Patent Application No. 62/672,290, filed on May 16, 2018, entitled "Optical and Functional Metrology of Microstructured Optical Fibers," the disclosure of which is hereby incorporated by reference in its entirety for all purposes.

BACKGROUND

Optical fibers have been employed for a variety of uses, including communication, sensors, and imaging. Optical fibers of various constructions exist and generally include a waveguide structure, such as a waveguide made of a central core and a surrounding cladding layer, with additional buffer and jacket layers optionally included to provide protection during handling or exposure to environmental conditions. Specialty optical fibers are available. Techniques are needed to improve and expand the manufacturing of optical fibers.

SUMMARY

This application relates to optical fiber use, manufacturing, and characterization. More specifically, and without limitation, this application relates to systems and methods for using, making, and characterizing optical fibers, such as microstructured optical fibers that include a waveguiding element and a mechanical region with one or more mass reduction elements positioned between the waveguiding element and an outer periphery of the optical fiber.

In a first aspect, systems are provided, such as systems for optically characterizing optical fibers. Optionally, the disclosed systems are useful for characterizing microstructured optical fibers using optical metrology, functional metrology, or both. In some embodiments, a system for optically characterizing an optical fiber comprises a microscope for obtaining a cross-sectional image of an optical fiber and a kinematic mount for positioning the optical fiber beneath a lens of the microscope. The cross-sectional image may be used in optical metrology techniques. Optionally, the system may comprise one or more processors in data communication with the microscope. The one or more processors may be programmed with instructions or positioned in data communication with a non-transitory storage medium containing instructions. Optionally the instructions, when executed by the one or more processors, may cause the one or more processors to perform operations including: determining a reference coordinate system using the cross-sectional image, such as a reference coordinate system that includes a first axis and a second axis; characterizing a spatial distribution of a plurality of microstructures within the optical fiber, such as by identifying positions and sizes of each microstructure; determining second moments of area of the optical fiber with respect to the first axis and the second axis, such as by using the spatial distribution of the plurality of microstructures; and characterizing a symmetry of the optical fiber using the second moments of area. Optionally, the second moments of area may be used to determine a first vibrational frequency of the optical fiber with respect to a first axis; and determining a second vibrational frequency of the optical fiber with respect to the second axis using the second moments of area. In some embodiments, determining the reference coordinate system includes fitting a periphery of the optical fiber in the cross-sectional image to an elliptical shape.

Optionally, a system of this aspect may further comprise an interferometer and a second kinematic mount for positioning the optical fiber in a beam path of the interferometer. It will be appreciated that the kinematic mount may be arranged such that the optical fiber can be held within a cantilevered configuration, with the cantilevered portion of the optical fiber having a particular known or calibrated length. In a cantilevered configuration, the optical fiber may be allowed to oscillate or vibrate according to a natural or resonant frequency, which may be related to or dependent upon a length of the cantilevered portion, and the mass distribution within the cantilevered portion. The system may optionally comprise an actuation mechanism for applying a force to the optical fiber, such as to induce oscillation or vibration of the fiber.

Advantageously, an interferometer may be useful for performing functional metrology techniques to assess physical properties of the optical fiber. Optionally, operations performed by a processor may include or further include determining a first natural frequency response of the optical fiber along the first axis using the interferometer; and determining a second natural frequency response of the optical fiber along the second axis using the interferometer. The natural frequency response may be determined by obtaining an interferogram using the interferometer as the optical fiber vibrates or oscillates within the beam path of the interferogram. The interferogram may then be transformed to determine frequencies of the vibrations or oscillations, which may be representative of the natural frequency responses of the optical fiber.

Optionally, a processor may perform additional operations including determining one or more errors in the optical fiber or characteristics of the optical fiber. As examples, errors may include, but are not limited to, a position error for one or more of the plurality of microstructures, a size error for one or more of the plurality of microstructures, a symmetry error for the optical fiber, a difference between a first natural frequency response and a second natural frequency response, a difference between a first vibrational frequency of the optical fiber determined using the second moments of area and a second vibrational frequency of the optical fiber determined using the second moments of area ($I_{xx}$, $I_{yy}$, $I_{xy}$), damping ratios, or any combination of these. Example characteristics of the optical fiber include, but are not limited to, a first natural frequency response, a second natural frequency response, a spatial distribution of the plurality of microstructures, a second moment of area of the cross-section of an optical fiber, a reference coordinate system, a symmetry of the optical fiber, a first vibrational frequency of the optical fiber determined using the second moments of area, a second vibrational frequency of the optical fiber determined using the second moments of area, an error in the optical fiber, a difference between the first natural frequency response and the second natural frequency response, a difference between the first vibrational frequency and the second vibrational frequency, a difference between a vibrational frequency determined using the second moments of area and a natural frequency response, a damping ratio for the optical fiber, or any combination of these. Optionally, characteristics of the optical fiber may be derived from or may be determined using measured or characterized aspects of the optical fiber, such as a cross-sectional image, a natural frequency response, a spatial distribution of the plurality of microstructures, a reference coordinate system, a second moment of area, an oscillation duration, etc.

The determined characteristics and errors may be used to assess a manufacturing process for the optical fiber. Optionally, one or more characteristics or errors are stored to a data store, such as in association with an identifier for the optical fiber. Optionally, one or more characteristics or errors are provided in a notification, such as a notification presented to a user, such as via a user interface. Optionally, one or more characteristics or errors are used to determine whether the optical fiber passes or fails a quality control metric. For example, errors or characteristics may be compared to threshold values to determine whether an optical fiber meets a quality control metric. Optionally, one or more characteristics or errors are used as part of a failure mode analysis, which may indicated predicted or expected failures, failure points, operational lives, etc. of an optical fiber. In some cases, optical fibers that meet a quality control metric and/or failure mode analysis may be useful for certain application, such as incorporation in a fiber scanning display or imaging system. In some cases, optical fibers that do not meet a quality control metric and/or failure mode analysis may be suitable for certain application, such as incorporation in a fiber scanning display or imaging system.

Optionally, the characteristics or errors of the optical fiber may be used to improve a manufacturing process for the optical fiber. For example, optionally, a design for a preform for another optical fiber may be generated or modified using one or more characteristics or errors of the optical fiber. Optionally, a preform for an optical fiber that has been characterized can be modified or revised by identifying errors, changes, or improvements that could be made to an optical fiber to generate a new preform for a new optical fiber that may overcome some or all of those errors and/or incorporate some or all of the changes or improvements.

A system of this aspect may correspond to an optical fiber system and may include, for example, an interferometer; an optical fiber positioned in a beam path of the interferometer; an actuator in mechanical contact with the optical fiber, such as an actuator that is configured to receive control signals and induce movement in the optical fiber in response thereto; and control circuitry in communication with the interferometer and the actuator. Optionally, the control circuitry may comprise one or more processors programmed with instructions or in data communication with a non-transitory computer readable storage medium comprising instructions. The instructions, when executed by the one or more processors, may cause performance of operations including applying one or more control signals to the actuator to induce movement in the optical fiber; using the interferometer to obtain one or more interferometric measurements of the optical fiber; determining one or more mechanical characteristics of the optical fiber based on the one or more control signals and the one or more interferometric measurements; evaluating the one or more mechanical characteristics of the optical fiber against a set of criteria or characteristics; and performing one or more operations based on results of the evaluating. Example operations to be performed based on results of the evaluating may include, but are not limited to, generating a notification indicating results of the evaluating, optionally through a user interface, adjusting an actuation frequency for inducing movement in the optical fiber, performing a quality control or failure more analysis, generating a new preform design, etc. In embodiments, obtaining the one or more interferometric measurements of the optical fiber is performed during or after applying the one or more control signals to the actuator to induce movement in the optical fiber. In this way, vibrations of the optical fiber can be excited and monitored using the interferometer. Optionally, in some examples, systems of this aspect may correspond to optical-based systems, such as fiber scanning displays or imaging systems. In some embodiments, such optical-based systems may represent optical-based subsystems of other, larger systems. For example, in at least some of these embodiments, systems of this aspect may correspond to fiber scanning displays in head-mounted display systems.

A variety of control signals may be used to induce actuation of an optical fiber. Control signals may be applied, for example, to an actuator, such as a piezoelectric actuator, in mechanical contact with the optical fiber to induce actuation through voltage controlled expansion and/or contraction of the piezoelectric actuator. Optionally, applying the one or more control signals to the actuator includes applying a predetermined step function control signal to the actuator to induce movement in the optical fiber along a particular axis of a reference coordinate system. Optionally, determining the one or more mechanical characteristics includes determining a natural frequency response of the optical fiber along the particular axis. A step function may be useful in actuating oscillation of the optical fiber along a natural or resonant frequency and/or in determination of damping ratios, for example. Optionally, applying the one or more control signals to the actuator includes applying the one or more control signals to the actuator to induce oscillation in the optical fiber at a particular frequency. In some cases, the actuator may induce oscillation at a natural or resonant frequency of the optical fiber or substantially at the natural or resonant frequency of the optical fiber. Optionally, operations performed based on results of an evaluating may include determining a new or adjusted frequency for oscillation of the optical fiber; and applying one or more control signals to the actuator to induce oscillation in the optical fiber at the adjusted or new frequency.

In some embodiments, evaluating the one or more mechanical characteristics includes performing a failure mode analysis on the optical fiber. In this way, the optical fiber may be analyzed to determine points of potential failure, which may be characteristic of manufacturing defects, for example. A failure mode analysis may thus be useful for improving and evaluating optical fiber manufacturing processes. Example criteria used in evaluating the one or more mechanical characteristics include, but are not limited to, errors or characteristics of the optical fiber, expected natural or resonant frequencies of the optical fiber, etc.

Optionally, performing the one or more operations based on results of the evaluating may include providing a notification for output through a user interface, the notification including a result of the failure mode analysis or a quality control metric. For example, the notification may indicate passing a failure mode analysis or quality control metric, failure of the failure mode analysis or quality control metric, a predicted failure mode or mechanism for the optical fiber, and/or a quality control metric.

Optionally, systems of this aspect may further comprise one or more electro-optical components optically coupled to the optical fiber, such as a non-cantilevered portion of the optical fiber. For example, useful electro-optical components include, but are not limited to, a light source configured to project light into the non-cantilevered portion of the optical fiber and an imaging sensor configured to receive light from the non-cantilevered portion of the optical fiber.

These electro-optical components may be useful for evaluating the utility of the optical fiber in optical-based systems, such as fiber scanning displays or imaging systems, for example.

An interferometer may be used, in embodiments, for obtaining interferograms. For example, one or more interferometric measurements may optionally comprise interferograms of the optical fiber. Interferograms may be useful for determining optical fiber characteristics or errors, as described herein. Optionally, operations performed by a processor may include transforming the interferogram to obtain frequency measurements corresponding to a natural frequency response or an induced frequency response of an optical fiber.

In another embodiment, a system for evaluating an optical fiber comprises an imaging system, an interferometer, a kinematic mount for positioning an optical fiber in any of a plurality of different positions, such as a plurality of different positions including a first position in which the optical fiber is positioned beneath a lens of the imaging system and a second position in which the optical fiber is positioned in a beam path of the interferometer, and one or more processors in data communication with the imaging system and the interferometer. Optionally, the one or more processors are programmed with instructions that, when executed by the one or more processors, cause the one or more processors to perform operations including: obtaining a cross-sectional image of the optical fiber in the first position using the imaging system; obtaining one or more interferometric measurements of the optical fiber in the second position using the interferometer; determining a plurality of mechanical characteristics of the optical fiber based on the cross-sectional image and the one or more interferometric measurements; evaluating the plurality of mechanical characteristics of the optical fiber against a set of criteria; and performing one or more additional operations based on results of the evaluating. Optionally, the imaging system comprises a lens assembly and an imaging device configured to capture images through the lens assembly. Example lens assemblies comprise a microscope or are a component of a microscope.

Optionally, the operations may further include determining a reference coordinate system using the cross-sectional image, such as a reference coordinate system that includes a first axis and a second axis. Optionally, determining the plurality of mechanical characteristics of the optical fiber based on the cross-sectional image and the one or more interferometric measurements further comprises determining second moments of area of the optical fiber with respect to the first axis and the second axis. In some embodiments, the operations may further include characterizing a spatial distribution of a plurality of microstructures within the optical fiber. Optionally such characterizing may include identifying positions and sizes of each microstructure. Optionally, determining second moments of area of the optical fiber with respect to the first axis and the second axis may comprise determining second moments of area of the optical fiber with respect to the first axis and the second axis based on the spatial distribution of the plurality of microstructures. Optionally, determining the plurality of mechanical characteristics of the optical fiber based on the cross-sectional image and the one or more interferometric measurements comprises or further comprises determining a first vibrational frequency of the optical fiber with respect to the first axis based on the second moments of area; and determining a second vibrational frequency of the optical fiber with respect to the second axis based on the second moments of area.

In some embodiments, determining the plurality of mechanical characteristics of the optical fiber based on the cross-sectional image and the one or more interferometric measurements comprises or further comprises determining natural frequency responses of the optical fiber along the first axis and the second axis. Optionally, a system of this aspect may further comprise an actuator in mechanical contact with the optical fiber and in data communication with the one or more processors, the actuator configured to receive control signals and induce movement in the optical fiber in response thereto. Optionally, the operations further include applying one or more control signals to the actuator to induce movement in the optical fiber. Optionally, obtaining the one or more interferometric measurements of the optical fiber is performed during or after applying the one or more control signals to the actuator to induce movement in the optical fiber. In some embodiments, obtaining the one or more interferometric measurements of the optical fiber comprises obtaining one or more interferograms of the optical fiber. Optionally, determining natural frequency responses of the optical fiber along the first axis and the second axis may comprise transforming the one or more interferograms to obtain frequency measurements corresponding to natural frequency responses of the optical fiber. Optionally, determining the reference coordinate system includes fitting a periphery of the optical fiber in the cross-sectional image to an elliptical shape.

In some embodiments, the operations may include or further include storing data indicating one or more of the plurality of mechanical characteristics of the optical fiber to a data store in association with an identifier for the optical fiber. Optionally, performing one or more additional operations based on results of the evaluating comprises generating a notification based on results of the evaluating; and providing the notification for output through a user interface. In some embodiments, evaluating the plurality of mechanical characteristics of the optical fiber against the set of criteria comprises identifying the optical fiber as passing or failing a quality control metric based on one or more of the plurality of mechanical characteristics of the optical fiber.

In other aspects, methods of characterizing optical fibers are disclosed, such as microstructured optical fibers. For example, a method of this aspect may correspond to a method of optically characterizing an optical fiber, which may be referred to herein as an optical metrology technique. Methods of this aspect may optionally use systems described herein. In an embodiment, a method of this aspect comprises obtaining a cross-sectional image of an optical fiber; determining a reference coordinate system using the cross-sectional image, such as a reference coordinate system that includes a first axis and a second axis; characterizing a spatial distribution of a plurality of microstructures within the optical fiber, such as by identifying positions and sizes of each microstructure; determining second moments of area of the optical fiber with respect to the first axis and the second axis, such as by using the spatial distribution of the plurality of microstructures; and characterizing a symmetry of the optical fiber using the second moments of area. As described above, the optical fiber may be mounted under a lens of a microscope to obtain the cross-sectional image. Optionally a kinematic mount may be used to mount the optical fiber and position the optical fiber under the lens.

Various characteristics of the optical fiber may be determined using the methods of this aspect. For example, the reference coordinate system may be determined by fitting a periphery of the optical fiber in the cross-sectional image to an elliptical shape. For example, the axes of the ellipse may correspond to the reference coordinate system axes. Optionally, a spatial distribution of microstructures in the optical fiber may be characterized by fitting features in the cross-sectional image to circular or elliptical shapes for example, such as to determine a size and position of each microstructure. The spatial distribution of microstructures and the reference coordinate system may be used, in embodiments, to determine the second moments of area of the optical fiber with respect to the reference coordinate system. Other example characteristics may be derived using the spatial distribution of the plurality of microstructures, the second moments of area, the reference coordinate system, or any combination of these, such as a symmetry of the optical fiber, a first vibrational frequency of the optical fiber with respect to a first reference axis, a second vibrational frequency of the optical fiber with respect to a second reference axis, an error in the optical fiber, a difference between the first vibrational frequency and the second vibrational frequency, an orientation of the reference coordinate system, such as the first axis, the second axis, the first reference axis and/or the second reference axis, or any combination of these. Optionally, errors in the optical fiber may be determined or identified. Example errors include, but are not limited to a position error for one or more of the plurality of microstructures, a size error for one or more of the plurality of microstructures, a symmetry error for the optical fiber, a difference between a first vibrational frequency of the optical fiber and a second vibrational frequency of the optical fiber, an orientation of the reference coordinate system, such as the first axis, the second axis, the first reference axis and/or the second reference axis, or any combination of these.

In some embodiments, methods of this aspect may comprise making the optical fiber. It will be appreciated that optical fibers may be made by assembling a preform, fusing the preform by heating it to about or close to a glass transition temperature of materials in the preform, and drawing an optical fiber from the fused preform. Optionally, methods of this aspect may allow for improvements to the manufacturing or design of an optical fiber by designing or modifying a preform for a second optical fiber using one or more characteristics or errors of the optical fiber. The design of the preform may be informed by knowing a previous preform design and a resultant optical fiber's characteristics. Optionally, machine learning techniques may be applied, which may evaluate a plurality of preform designs and resultant optical fibers to identify relationships between preform designs and result optical fiber characteristics, and used to generate new preform designs to correct an error or otherwise modify an optical fiber design or make improvements to an optical fiber.

Optionally, one or more characteristics or errors of the optical fiber may be stored to a data store, such as in association with an identifier for the optical fiber. Optionally, a notification providing the one or more characteristics of the optical fiber may be generated, such as to inform a user of properties associated with an optical fiber. Optionally, the optical fiber may be identified as passing or failing a quality control metric or failure mode analysis, such as based on one or more characteristics or errors of the optical fiber.

Optionally, optical metrology techniques may be applied in tandem with functional metrology techniques. For example, a method incorporating both optical and functional metrology may comprise or further comprise mounting the optical fiber in a stiff mount, such as a collet mount and/or a kinematic mount; positioning the mount to place the optical fiber under a lens of a microscope, such as a microscope that is used to obtain the cross-sectional image; positioning the mount to place the optical fiber in a beam path of an interferometer; applying a force to the optical fiber to induce oscillation of the optical fiber along the first axis and the second axis; determining a first natural frequency response of the optical fiber along the first axis using the interferometer; and determining a second natural frequency response of the optical fiber along the second axis using the interferometer. Having the additional characteristics of the natural frequency responses of the fiber may be useful, for example, to allow for determination of other characteristics. For example, characteristics may include the symmetry of the optical fiber, a first vibrational frequency of the optical fiber with respect to the first axis determined using the second moments of area, a second vibrational frequency of the optical fiber with respect to the second axis determined using the second moments of area, an error in the optical fiber, a difference between the first natural frequency response and the second natural frequency response, a difference between the first vibrational frequency and the second vibrational frequency, a difference between a vibrational frequency of the optical fiber determined using the second moments of area and a natural frequency response of the optical fiber, the orientation of the principal axes or directions, such as the reference coordinate system, or any combination of these, may be determined using, for example, the first natural frequency response, the second natural frequency response optical fiber, the spatial distribution of the plurality of microstructures, the second moments of area, the reference coordinate system, or any combination of these. In addition or alternatively, errors in the optical fiber may be determined, such as a position error for one or more of the plurality of microstructures, a size error for one or more of the plurality of microstructures, a symmetry error for the optical fiber, a difference between the first natural frequency response and the second natural frequency response, a difference between a first vibrational frequency of the optical fiber with respect to the first axis determined using the second moments of area and a second vibrational frequency of the optical fiber with respect to the second axis determined using the second moments of area, the orientation of the principal axes or directions, such as the reference coordinate system, or any combination of these.

In some aspects, functional metrology methods may be used on their own. For example, a method of this aspect for functionally characterizing an optical fiber, such as a microstructured optical fiber, comprises mounting the optical fiber in an interferometer; applying a force to the optical fiber to induce oscillation of the optical fiber along a first axis and a second axis; determining a first natural frequency response of the optical fiber along the first axis using the interferometer; and determining a natural second frequency response of the optical fiber along the second axis using the interferometer. Optionally, mounting the optical fiber includes mounting the optical fiber in a collet mount or kinematic mount and positioning the mount to place the optical fiber in a beam path of the interferometer.

As described above, one or more characteristics of the optical fiber may be determined, such as using the first natural frequency response and the second natural frequency response. Optional characteristics derivable from the natural frequency responses include, but are not limited to a symmetry of the optical fiber, an error in the optical fiber, a difference between the first natural frequency response and the second natural frequency response, the orientation of the principal axes or directions, such as reference coordinate system, the first axis, the second axis, the first reference axis, and/or the second reference axis, or any combination of these. Errors in the optical fibers may also be determined, such as a symmetry error for the optical fiber, a difference between the first natural frequency response and the second natural frequency response, the orientation of the principal axes or directions, such as the reference coordinate system, or any combination of these.

The characteristics and errors that are determined using the functional metrology techniques described herein may also be used to improve or inform optical fiber manufacturing. Optionally, a method of this aspect further comprises making the optical fiber, such as from a preform. In some embodiments, a second preform for a second optical fiber or a design for the second preform may be generated using one or more characteristics of the optical fiber. As described above, characteristics of the optical fiber may be useful for evaluating whether the optical fiber has suitable characteristics and by modifying a preform or a design for a preform, changes to an optical fiber design may be captured and tested by making new optical fibers using updated preform designs.

Optionally, methods of this aspect may include one or more of storing one or more characteristics or errors of the optical fiber to a data store in association with an identifier for the optical fiber; generating a notification providing the one or more characteristics or errors of the optical fiber; or identifying the optical fiber as passing or failing a quality control metric or failure mode analysis based on the one or more characteristics or errors of the optical fiber.

In some embodiments, a method of making an optical fiber from a preform comprises evaluating one or more mechanical characteristics of a first set of one or more optical fibers, designing or modifying the preform based at least in part on results of the evaluating; and making a second set of one or more optical fibers from the preform. Optionally, evaluating the one or more mechanical characteristics of each optical fiber in the first set of one or more optical fibers comprises determining second moments of area of a cross-section of the optical fiber with respect to a first axis and a second axis; and determining natural frequency responses of the optical fiber along the first axis and the second axis. Optionally, each of the first set of one or more optical fibers and the second set of one or more optical fibers comprises one or more microstructured optical fibers.

In some embodiments, evaluating the one or more mechanical characteristics of each optical fiber in the first set of one or more optical fibers comprises or further comprises obtaining a cross-sectional image of a optical fiber; determining a reference coordinate system using the cross-sectional image, such as a reference coordinate system includes a first axis and a second axis; and characterizing a spatial distribution of a plurality of microstructures within the optical fiber, such as where characterizing includes identifying positions and sizes of each microstructure. Optionally, determining second moments of area of the cross-section of the optical fiber with respect to the first axis and the second axis comprises determining second moments of area of the cross-section of the optical fiber using the spatial distribution of the plurality of microstructures. Optionally, determining the reference coordinate system includes fitting a periphery of the optical fiber in the cross-sectional image to an elliptical shape.

Optionally, evaluating the one or more mechanical characteristics of each optical fiber in the first set of one or more optical fibers comprises or further comprises mounting the optical fiber in an interferometer; and applying a force to the optical fiber to induce oscillation of the optical fiber along the first axis and the second axis. Optionally, determining natural frequency responses of the optical fiber along the first axis and the second axis comprises determining a first natural frequency response of the optical fiber along the first axis using the interferometer; and determining a natural second frequency response of the optical fiber along the second axis using the interferometer.

In some embodiments, evaluating the one or more mechanical characteristics of each optical fiber in the first set of one or more optical fibers further comprises determining a first vibrational frequency of the optical fiber with respect to the first axis using the second moments of area; and determining a second vibrational frequency of the optical fiber with respect to the second axis using the second moments of area. Optionally, the first set of one or more optical fibers comprise a plurality of optical fibers associated with a plurality of different preform designs, respectively.

In some embodiments, evaluating the one or more mechanical characteristics of the plurality of optical fibers comprises or further comprises identifying relationships between the plurality of different preform designs and the one or more mechanical characteristics of the plurality of optical fibers associated therewith, respectively. Optionally, designing or modifying the preform based at least in part on results of the evaluating comprises designing or modifying the preform based at least in part on the identified relationships.

In some embodiments, a method of this aspect further comprises obtaining a cross-sectional image of the optical fiber in the first position using an imaging system. Optionally, determining second moments of area of the cross-section of the optical fiber with respect to the first axis and the second axis comprises determining second moments of area of the cross-section of the optical fiber with respect to the first axis and the second axis based on the cross-sectional image.

In some embodiments, a method of this aspect further comprises obtaining one or more interferometric measurements of the optical fiber in the second position using the interferometer. Optionally, determining natural frequency responses of the optical fiber along the first axis and the second axis comprises determining natural frequency responses of the optical fiber along the first axis and the second axis based on the one or more interferometric measurements.

In another aspect, computer program products are provided herein, such as computer program products for performing methods relating to characterizing an optical fiber, such as optically or functionally. In an embodiment, a computer program product of this aspect corresponds to a non-transitory computer readable storage medium comprising instructions that, when executed by one or more processors, cause the one or more processors to perform any of the methods or steps thereof that are described herein.

The foregoing, together with other features and embodiments, will become more apparent upon referring to the following description, claims and accompanying drawings. It will be appreciated that the optical fibers and scanning fiber displays of the above aspects may optionally include features and aspects described in the below description.

DETAILED DESCRIPTION

Figure 1A:
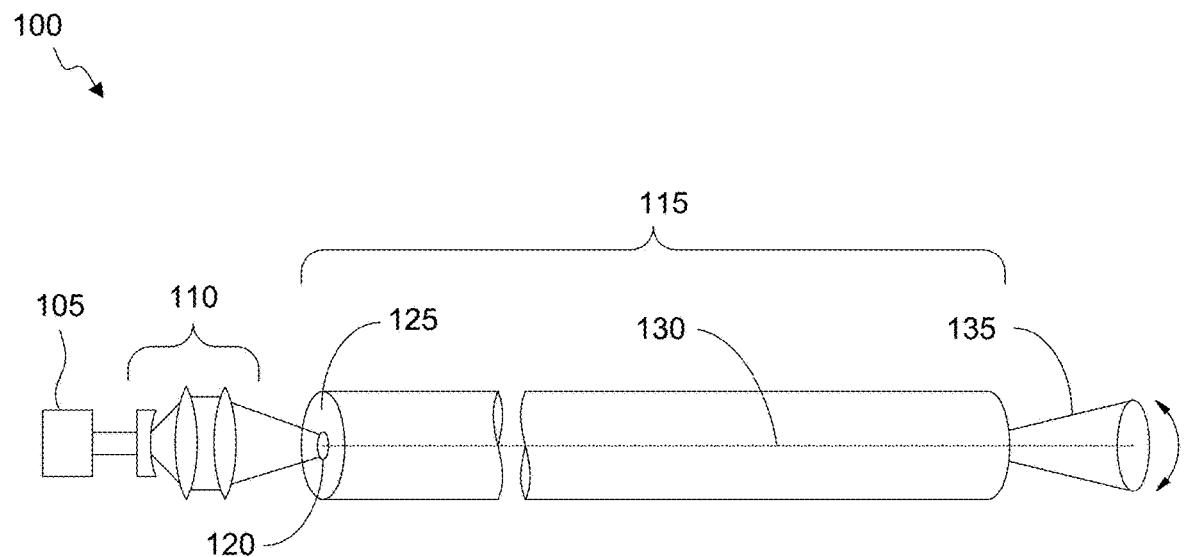
FIG. 1A and FIG. 1B provide schematic illustrations of example optical fiber systems in accordance with some embodiments.

Described are systems and techniques for characterizing optical fibers. Disclosed systems and techniques employ optical metrology, functional metrology, or both to characterize microstructured optical fibers and determine fiber characteristics, errors, failure mode analysis, and quality control metrics. The characteristics, errors, failure mode analysis, and quality control metrics are useful for improving the manufacturing of optical fibers FIG. 1A provides a schematic illustration of an example optical fiber system 100. Example optical fiber system 100 includes an optical source 105, coupling optics 110, and optical fiber 115. Optical source 105 may include a light emitting diode, a laser, or other visible optical source, for example. Optical source 105 may optionally include a plurality of sub-sources or a multi-color optical source, such as sources outputting different wavelengths of electromagnetic radiation. In embodiments, optical source 105 may be switchable, such as to allow for control over the output or intensity of the optical source 105 as a function of time.

Coupling optics 110 may include one or more optical elements, such as lenses, mirrors, reflectors, etc., arranged in a configuration to enable light from optical source 105 to be suitably directed into the core 120 of optical fiber 115 for waveguiding. Thus, optical source 105 may be positioned in optical communication with a waveguiding element of optical fiber 115. It will be appreciated that the coupling optics needed to efficiently couple light from optical source 105 may be dependent upon optical source 105 and the geometry, materials, and/or the numerical aperture of the optical fiber 115.

As illustrated, optical fiber 115 includes core 120 and cladding 125 and has an axis 130, which may correspond to an optical axis or a waveguiding axis, for example. Light from optical source 105 that is coupled into core 120 and waveguided along the length of optical fiber 115 may be output at the opposite end of optical fiber 115. It will be appreciated that the spot shape and direction of the light output from optical fiber 115 may be dependent upon the geometry, materials, and/or the numerical aperture of the optical fiber 115. Typically, output from an optical fiber exhibits a cone shape 135, with the angle of the cone shape 135 again defined by the geometry, materials, and/or the numerical aperture of the optical fiber 115.

Optical fibers may be used in a cantilever configurations to provide optical resonators that are useful for projecting light as the optical fiber resonates. By controlling the light injected into the optical fiber as the optical fiber resonates, the light output pattern can form a desired images. Resonations of optical fibers can be actively controlled, providing more precision over the output light pattern from a display device employing a scanning optical fiber.

Figure 1B:
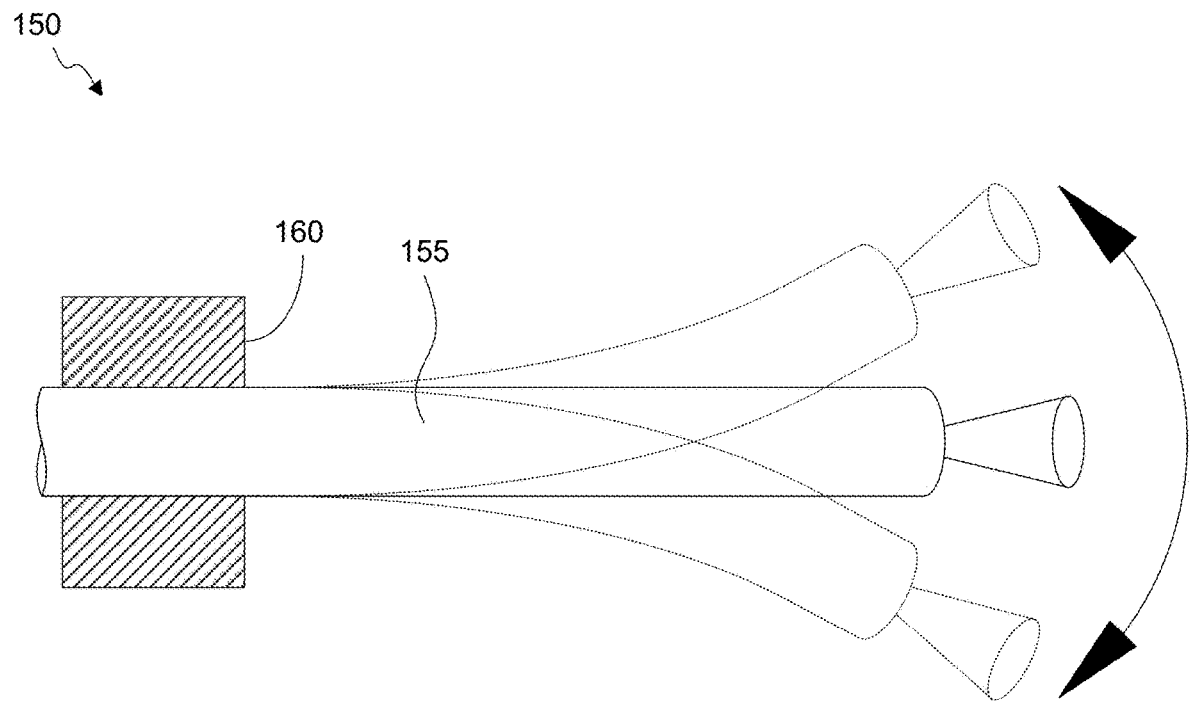

FIG. 1B provides a schematic illustration of an optical fiber system 150, such as may be present in a scanning fiber display system or in any systems described herein. General details of a scanning fiber display system may be found, for example, in U.S. patent application Ser. No. 14/156,366, filed on Jan. 15, 2014 and published under publication no. US 2015/0268415, which is hereby incorporated by reference in its entirety.

FIG. 1B omits depiction of any optical source or coupling elements from optical fiber system 150 so as not to obstruct other details. Optical fiber system 150 includes optical fiber 155, which may correspond to optical fiber 115, and actuator 160. Actuator 160 may be used to impart oscillatory motion into optical fiber 155. Oscillations of optical fiber 155 may be modeled as or correspond to a cantilevered oscillator with a fixed end and a free end. Actuator 160 may be or include a piezoelectric actuator, an electromagnetic voice coil, or a thermal actuator, for example. Actuator 160 may allow for control over oscillatory motion of optical fiber 155 in two dimensions and may include two or more independent actuatable axes. The extent of the oscillatory motion of optical fiber 155 is depicted with dashed lines in FIG. 1B.

As noted, oscillatory motion may be actuated in two orthogonal directions. A desirable pattern optionally corresponds to a circular or spiral path, and to achieve such a pattern, the optical fiber resonant device may be driven along both directions at the same frequency. Achieving desired deflection in orthogonal actuation directions may employ fibers with natural resonant frequencies along these orthogonal directions that are close to one another.

For example, for fibers having a typical damping ratio of 0.15%, a suitable difference between natural resonant frequencies along the orthogonal directions may be 0.2% or less in order to achieve a desired deflection. To meet this requirement, optical fibers for such resonators may exhibit high rotational symmetry. In practice, optical fibers may be manufactured with such high symmetry, but as the complexity of the optical fiber increases, the ability to manufacture fibers having such high symmetry may become more difficult.

With such small tolerances, creation of a suitable optical fiber may be difficult. It will be appreciated that optical fibers may be made by a process in which a preform is assembled, which may correspond to a pattern of glass rods that are fused together in a melting process, after which a thread of optical fiber may be drawn from the fused preform. The optical fiber so drawn may have a cross section derivative of the pattern of glass rods included in the preform. Further, pressure differences, air currents, temperature differences, draw rate and direction, and other factors may impact the dimensions and symmetry of the drawn optical.

For use of optical fibers for most long distance optical transmission purposes, the indices of refraction of a core and a cladding surrounding the core may be the most important, as these properties allow the optical fiber to function as a waveguide and transmit light over long distances. For use in long distance transmission, the symmetry requirements of such optical fibers may be considerably lower (or even non-existent) as compared to the symmetry requirements for resonant fibers, such as used in a scanning fiber display.

Accordingly, optical fiber manufacturers may not routinely consider these resonant mechanical properties. When an optical fiber that possess an asymmetry greater than a particular threshold is used in a scanning fiber display or imaging device, the optical fiber may not oscillate suitably along two directions (as may be required for the scanning fiber display), may require significantly more oscillatory driving motion or power, or may break prematurely, rendering a scanning fiber display device or imaging device inoperable. Each of these is problematic and avoided through the use of suitably symmetric optical fibers. Again, however, optical fibers are not routinely analyzed for these purposes and so optical fiber manufacturers are not equipped to test whether their fibers meet the necessary requirements. The present disclosure provides techniques and systems for determining whether an optical fiber meets certain symmetry, manufacturing, and/or applications requirements, such as to allow the optical fibers to be successfully employed in a scanning fiber display or imaging device, for example.

Some optical fibers are manufactured to include microstructures within the optical fiber. These microstructures may be used in place of conventional core/cladding structures, and optical fibers including a periodic transverse arrangement of holes for purposes of functioning as a longitudinal waveguide may be referred to as photonic crystal fibers. Symmetry may be important for photonic crystal fibers, though mechanical properties may again not be routinely investigated if the photonic crystal fibers are not being used in scanning fiber displays or imaging devices.

For some embodiments, microstructures are used to impact and control the mechanical properties of an optical fiber. For example, U.S. Provisional Application No. 62/438,898, filed on Dec. 23, 2016, U.S. Provisional Application No. 62/464,298, filed on Mar. 27, 2017, U.S. Non-provisional application Ser. No. 15/851,330, filed on Dec. 21, 2017 and published under publication no. US 2018/0180875, and PCT International Application No. PCT/US2017/067973, filed on Dec. 21, 2017, which are hereby incorporated by reference in their entireties, describe microstructured optical fibers in which the regions of the optical fiber are evacuated, filled with air, or filled with a reduced mass material to impact the resonant mechanical properties of the fiber.

Figure 2:
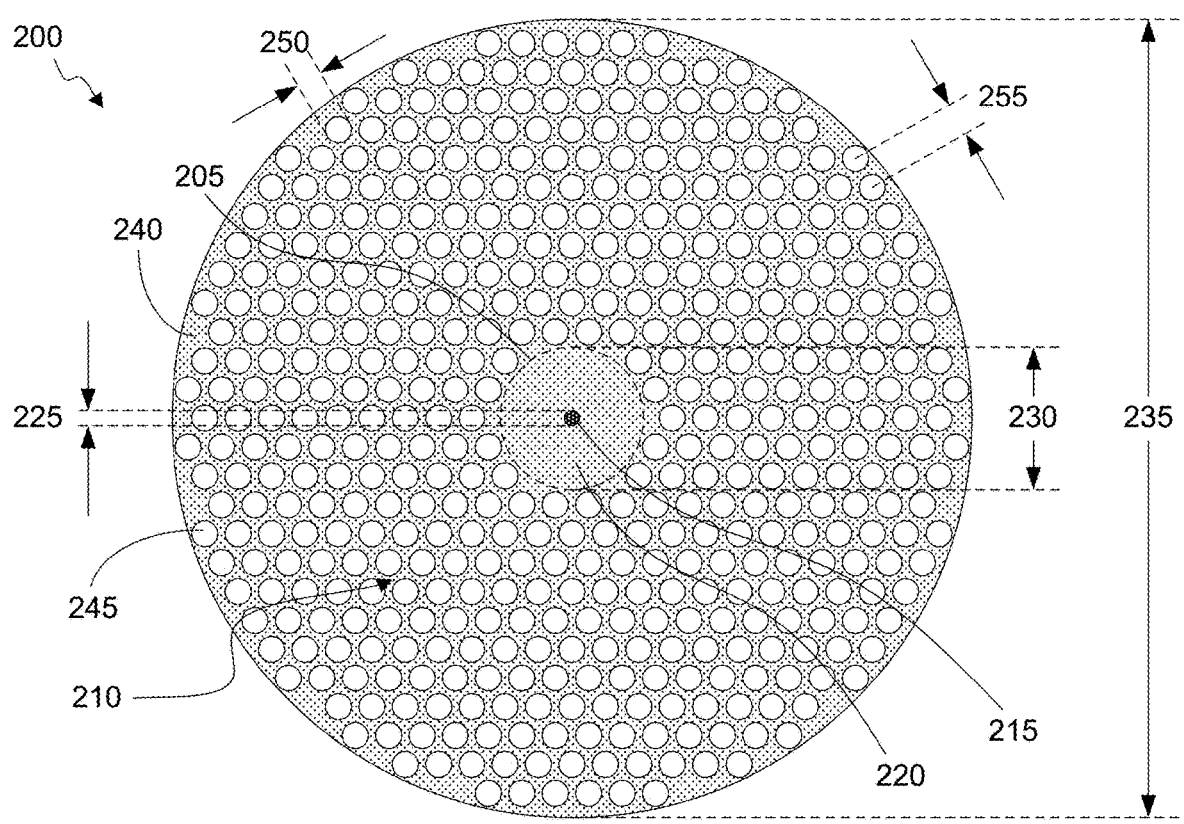
FIG. 2 provides a schematic illustration of a cross-section of an example microstructured optical fiber.

For example, FIG. 2 provides a schematic cross-sectional illustration of a microstructured optical fiber 200. Microstructured optical fiber 200 includes a waveguiding element 205 and a mechanical region 210 surrounding the waveguiding element. For illustration purposes, a dashed line is shown in FIG. 2 to better identify the transition between waveguiding element 205 and mechanical region 210. In FIG. 2, waveguiding element 205 includes a core 215 and a cladding 220 surrounding core 215. Core 215 is depicted as having a core diameter 225, waveguiding element 205 is depicted as having a cladding diameter 230, and optical fiber 200 is depicted as having an outer diameter 235.

Mechanical region 210 is depicted in FIG. 2 as including solid regions 240 and mass reduction regions 245 positioned between waveguiding element 205 and an outer periphery of mechanical region 210 and microstructured optical fiber 200. Example mass adjustment regions include, but are not limited to fluid-filled regions, gas- or air-filled regions, polymer-filled regions, glass-filled regions, and/or evacuated regions (e.g., vacuum-filled), with the fluid-, gas- or air-, polymer-, glass-filled, or evacuated regions having a density less than that of solid regions 240, cladding 220, core 215, or any combination of these. Optionally, solid regions 240 comprise the same material as cladding 220 and/or have similar or identical optical and/or mechanical properties. Optionally, solid regions 240 and cladding 220 comprise different materials and or have different optical and/or mechanical properties. It will be appreciated that additional materials, such as a buffer, jacket, or other coated or protective materials may be constructed outside of the outer periphery of mechanical region 210, but are not illustrated here.

Mass reduction regions 245 may be uniformly and/or regularly distributed throughout mechanical region 210 and any suitable or desirable geometries and distribution may be used in order to obtain particular mechanical properties of interest for microstructured optical fiber 200. It will be appreciated that mass reduction regions 245 may be arranged along axes parallel to one another and/or parallel to an axis of the optical fiber, such as a waveguiding axis or an optical axis. As illustrated in FIG. 2, mass reduction regions 245 exhibit uniform cross-sections, which are shown as circular and having a diameter 250. Pitch 255 corresponds to the center-to-center spacing between adjacent mass reduction regions 245. Mass reduction regions 245 may exhibit a symmetry, such as a cylindrical symmetry, about an axis of microstructured optical fiber 200, such as a waveguiding axis or optical axis. The optical fiber 200 may optionally exhibit rotational symmetry.

Without limitation, microstructured optical fiber 200 may be constructed by stacking lengths of materials of appropriate sizes to form an overall preform structure targeted for generating microstructured optical fiber 200, such as by using solid tubes and/or hollow tubes of suitable diameters, wall thickness, materials, shape, etc. In some embodiments, glass materials are used. Example glasses may include, but are not limited to silica glasses, fluoride glasses, phosphate glasses, chalcogenide glasses. In some embodiments, plastics or polymers may be used, such as polymethyl methacrylate, polystyrene, fluoropolymers, or polysiloxanes. Depending on the fabrication method and materials, the preform may be placed in a furnace to heat and fuse the different components of the preform and the heated preform may be drawn into a strand of optical fiber. Optionally, extrusion methods may be used, such as for fibers comprising polymer or plastic materials. It will be appreciated that various techniques, materials, and methods may be used to manufacture an optical fiber and a number of commercial fiber manufacturers exist and may provide services for manufacturing optical fibers based on specified parameters.

The different components of microstructured optical fiber 200 may take on any suitable dimensions and certain dimensions may be selected to provide particular properties, such as optical properties and mechanical properties. For example, core 215 may have, but is not limited to, a diameter of about 5 µm to about 25 µm. It will be appreciated that the term about, as used herein, is intended to include a variation around a specified value, such as a variation that would not modify the operational effect if the value were slightly smaller or slightly larger. In some embodiments, the term about may relate to a precision or tolerance of a value. In some embodiments, the term about may correspond to a variation of ±1% or less, a variation of ±5% or less, or a variation of ±10% or less.

As another example, the waveguiding element 205 may have, but is not limited to, a diameter of about 5 µm to about 200 µm, such as about 5 µm to about 125 µm. In some embodiments, cladding 220 may have, but is not limited to, a diameter or thickness of about 5 µm to about 200 µm, such as about 5 µm to about 125 µm, and may optionally be considered to encompass or may be integral or a unitary body with mechanical region 210 and thus may have a diameter or thickness corresponding to outer diameter 235. Outer diameter 235 may also take on any suitable value, such as about 10 µm to about 200 µm.

Each of mass reduction regions 245 may take on any suitable dimensions or shapes, and may, for example, have, but is not limited to, a cross-sectional dimension, such as diameter 250, radius, side length, or axis length, of about 1 µm to about 25 µm. Pitch 255 between mass reduction regions 245 may also take on any suitable dimensions, and may be limited by the cross-sectional dimensions of mass reduction regions 245. For example, pitch 255 may be greater than a diameter of mass reduction regions 245. Pitch 255 may have, but is not limited to, a length of between about 1 µm to about 25 µm. The mass reduction fraction of optical fiber 200 and/or mechanical region 210 may take on any suitable value based on the size, number, spacing, and arrangement of mass reduction regions. In embodiments, the plurality of mass reduction regions occupy between about 1% and 90% of the volume of optical fiber 200 or of the volume of mechanical region 210.

Depending on the particular configuration, in some embodiments, mass reduction regions may exhibit a 4-fold or 6-fold or other symmetry, such as cylindrical symmetry, rotational symmetry, or radial symmetry, about an axis of a microstructured optical fiber. In addition, other cross-sectional shapes for mass reduction regions may be utilized. For example, the cross-section of a mass reduction region may exhibit a polygonal shape, such as a triangle, square, rectangle, hexagon, etc., a round, circular, or oval shape, or any other suitable shape. In some embodiments, the cross-section of a mass reduction region may have shape with a regular symmetry, such as a circle, oval, ellipse, polygon, etc. In embodiments, combinations of different cross-sectional shaped mass reduction regions may be utilized. In embodiments, a spacing between adjacent mass reduction regions may be uniform or non-uniform. In embodiments, the cross-sectional dimensions, such as a diameter, radius, axis length, side length, etc., of different mass reduction regions may be uniform or non-uniform.

It will be appreciated that the embodiment of optical fiber 200 illustrated in FIG. 2 is merely exemplary and provided for purposes of more clearly describing the nature of the problem to which the present disclosure is directed. It will further be appreciated that FIG. 2 is a schematic illustration of an example microstructured optical fiber, which may possess perfectly or nearly perfectly positioned or sized microstructures. In practice, microstructured optical fibers may include errors which may impact the symmetry of the optical fiber. Identifying and characterizing these errors may be useful for determining, prior to use in a scanning fiber display, for example, whether the microstructured optical fiber will be suitable.

To assess quality of a microstructured optical fiber, different metrology techniques may be employed. One useful metrology technique may include optical metrology, where a photograph or other image of a cross-section of an optical fiber may or an end of an optical fiber be obtained and analyzed to identify whether an optical fiber has or is expected to have suitable properties, such as suitable vibrational or other mechanical properties to allow use in, for example, a scanning fiber display. Another useful metrology technique may employ functional metrology, where mechanical properties of an optical fiber may be obtained and analyzed to identify whether an optical fiber has or is expected to have suitable properties, such as suitable vibrational or other mechanical properties to allow use in, for example, a scanning fiber display. Optionally multiple metrology techniques may be employed in sequence.

Figure 3A:
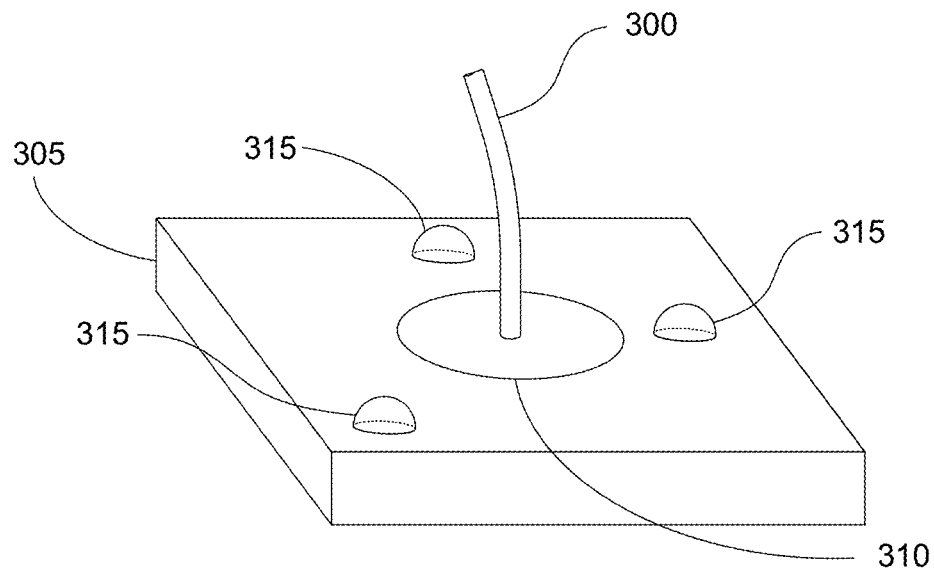
FIG. 3A and FIG. 3B provide schematic illustrations of an optical fiber mounted in a kinematic mount in preparation for optical and functional metrology.
Figure 3B:
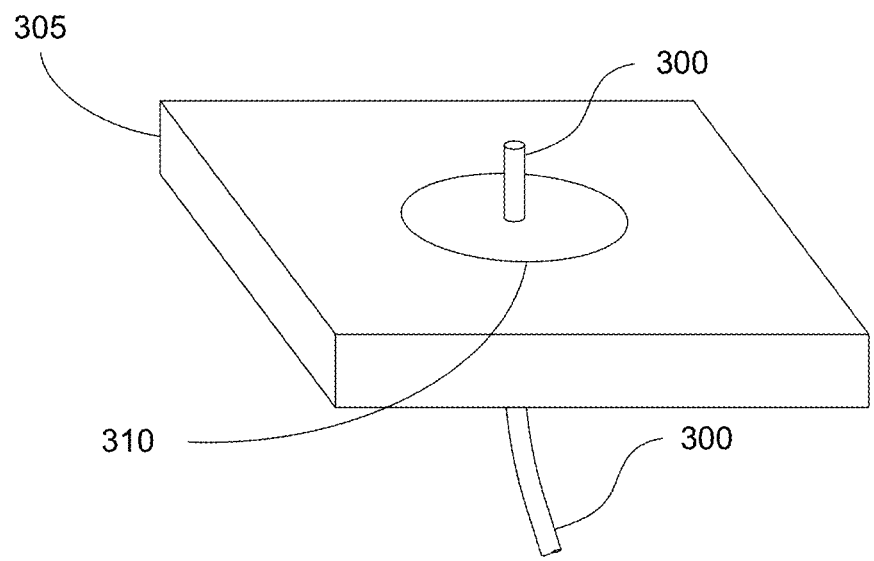

For purposes of metrology, an optical fiber may need to be measured or observed. An optical fiber may be placed in a mount in order to perform measurements or observations on the optical fiber. Optionally, a fiber may be mounted in a stiff mount, such as a collet mount and/or a kinematic mount to allow for replication of measurements and precise transfer of the optical fiber between measurement systems with a fixed orientation. FIG. 3A and FIG. 3B provide schematic illustrations of an optical fiber 300 mounted in a kinematic mount 305. FIG. 3A shows a bottom view and FIG. 3B shows a top view. Optical fiber 300 is fixed or otherwise attached to kinematic mount 305 by bracket 310. Bracket 310 may optionally allow optical fiber 300 to be rotated about an axis, such as an axis running along a length of optical fiber 300 and perpendicular to a base of kinematic mount 305. As illustrated, kinematic mount 305 may include mount points 315, which are illustrated as hemispherical objects, allowing repeatable mating with corresponding mount points on another object or device. It will be appreciated that FIG. 3A and FIG. 3B are not to scale and that the relative sizes of components and dimensions may be exaggerated for purposes of more clearly illustrating certain aspects. Kinematic mount 305 may be useful for mounting optical fiber 300 in another device for optical and/or functional metrology to assess characteristics of optical fiber 300.

Figure 4:
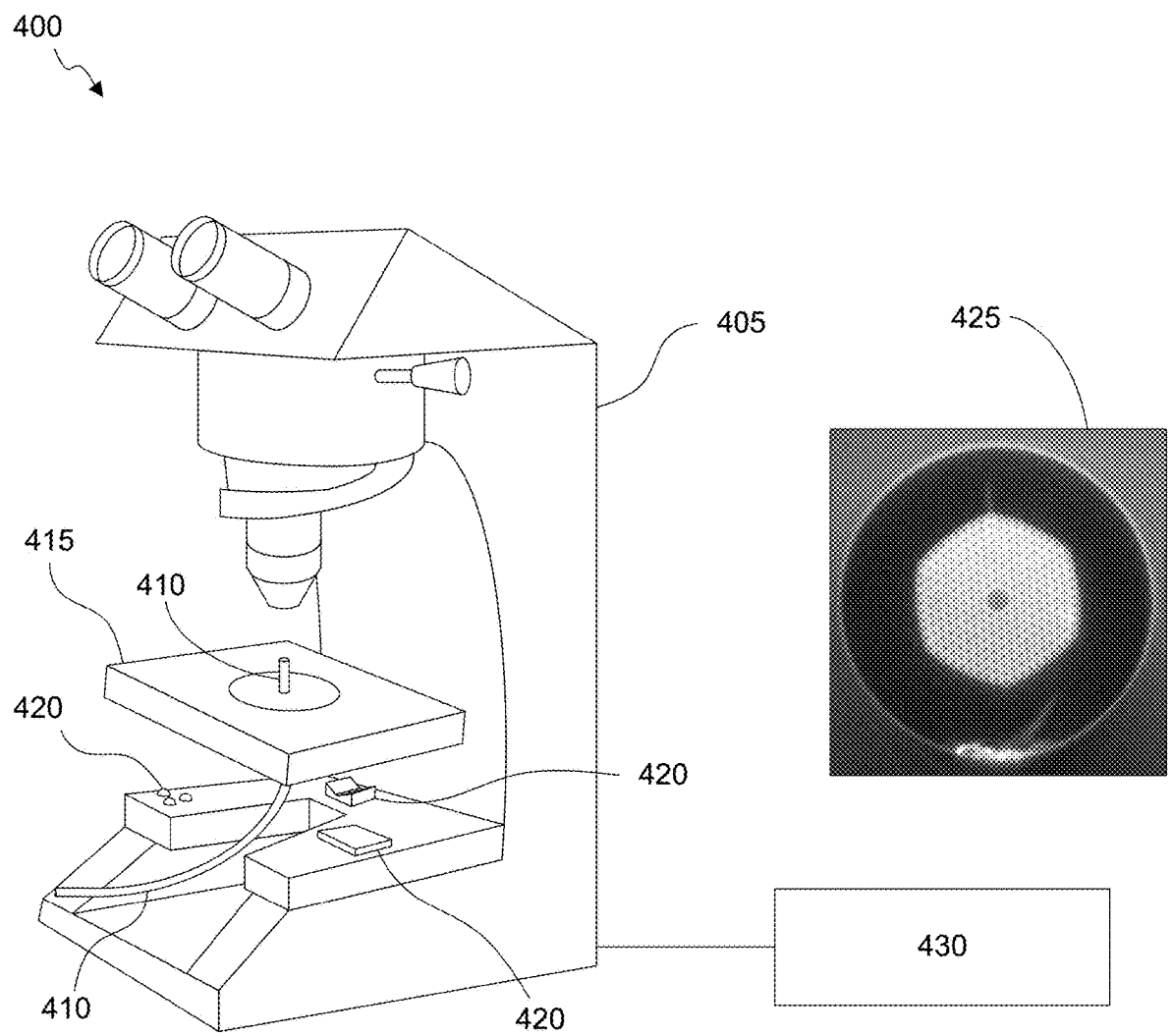
FIG. 4 provides a schematic illustration of an optical metrology systems, showing mounting of an optical fiber beneath a microscope lens to obtain a cross-sectional image of the optical fiber.

FIG. 4 provides a schematic illustration of a system 400 for optically characterizing an optical fiber in accordance with aspects described herein. System 400 includes imaging system 405 for obtaining a cross-sectional image of optical fiber 410. System 400 also includes kinematic mount 415, for positioning optical fiber 410 beneath a lens of imaging system 405 in order to obtain the cross-sectional image. System 400 includes both kinematic mount 415 as well as corresponding mount points 420. Imaging system 405 may correspond to or otherwise include a lens assembly and a digital imaging device (e.g., camera) for obtaining a digital image of the cross-section of optical fiber 410 through the lens assembly. In some embodiments, such a lens assembly may be configured to impart magnification to light that passes therethrough toward the imaging device. For example, imaging system 405 may correspond to or otherwise include a microscope and an imaging device configured to capture images through the microscope. An example of a cross-sectional image 425 of a microstructured optical fiber is also illustrated in FIG. 4. A computer 430, including a memory, non-transitory storage device, processor, etc., is positioned in data communication with imaging system 405 in order to allow optical metrology analysis of obtained cross-sectional images. Computer 430, or a component thereof, may be programmed with and/or store instructions that, when executed by a processor, cause performance of operations corresponding to an optical metrology analysis. Optionally, computer 430 may determine characteristics, errors, or other properties of optical fiber 410 as part of an optical metrology analysis.

Figure 5:
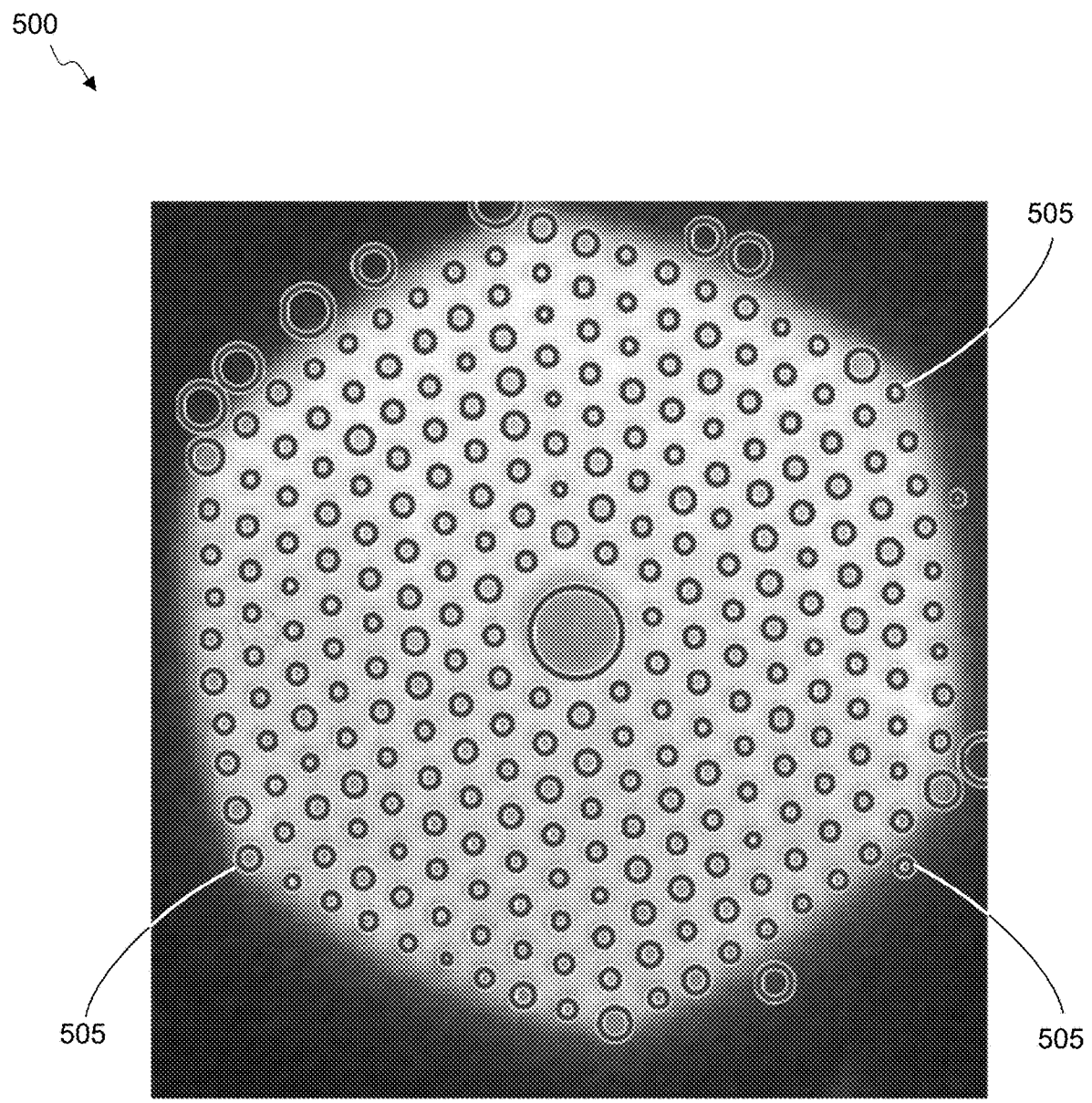
FIG. 5 provides a cross-sectional image of an optical fiber overlaid with analytical features as part of an optical metrology technique.

FIG. 5 provides a partial expanded view 500 of cross-sectional image 425 overlaid with analytical features 505 as part of an optical metrology technique. The optical metrology techniques of methods described herein include various image analysis components, including, but not limited to, determining reference coordinate systems, such as reference coordinate systems including a first axis and a second axis, and characterizing spatial distribution of a plurality of microstructures within a microstructured optical fiber. In FIG. 5, the analytical features 505 correspond to circular fits of portions of the cross-sectional image 425 which may represent microstructures, a core, a cladding, a periphery, etc., in the microstructured optical fiber. In FIG. 5, the analytical features 505 highlight a spatial distribution and sizes of identified microstructures. The spatial distribution may be useful in determining second moments of area of the microstructured optical fiber and characterizing a symmetry of the microstructured optical fiber.

Figure 6:
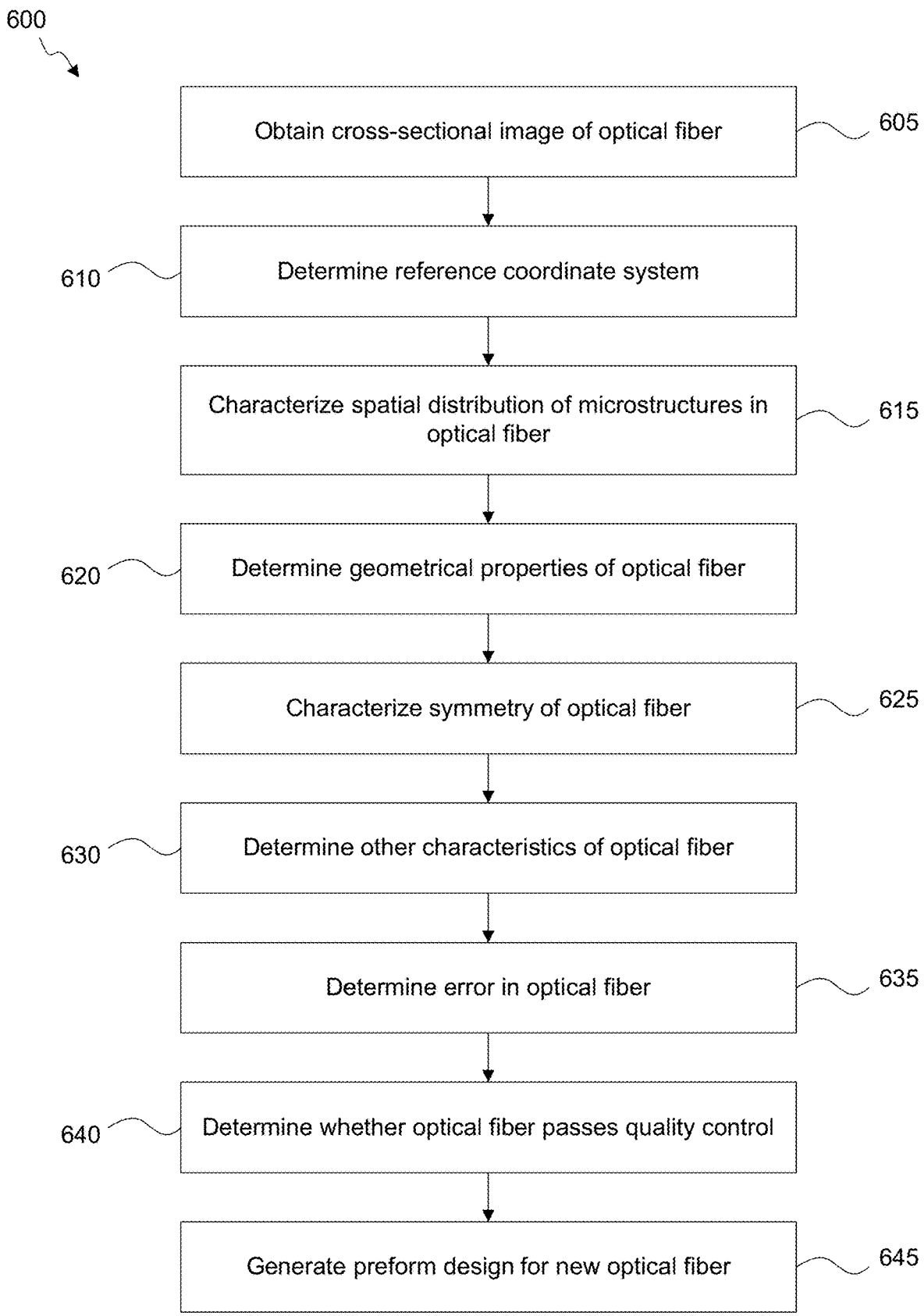
FIG. 6 provides an overview of a method for optically characterizing an optical fiber.

FIG. 6 provides an overview of a method 600 of optically characterizing an optical fiber, such as in accordance with an optical metrology technique. At block 605, a cross-sectional image of an optical fiber, such as a microstructured optical fiber, is obtained. The cross-sectional image may be obtained by using an imaging system, such as described above with reference to FIG. 4. For example, the cross-sectional image may be obtained by using an imaging system including a lens assembly (e.g., microscope) and an imaging device (e.g., camera). Obtaining the cross-sectional image may include receiving the cross-sectional image, such as over a network or serial bus from a connected or remote device. To obtain the cross-sectional image using an imaging system, the optical fiber may be mounted in a kinematic lens which may be positioned to place the optical fiber under a lens of the imaging system. Although kinematic mounts may provide particular advantages, as described herein, the cross-sectional image may be obtained by directly imaging the cross-section of the optical fiber or by mounting the optical fiber in another mount type.

At block 610, a reference coordinate system is determined, such as by using the cross-sectional image. The cross-sectional image may be analyzed to identify a periphery of the optical fiber and the periphery may be fit to a circle, an ellipse, or another shape. Fitting the periphery to an ellipse may advantageously allow a reference coordinate system to be identified based on the semi-major axis and the semi-minor axis of the ellipse. In some embodiments, the reference coordinate system may be arbitrarily defined. It will be appreciated that useful reference coordinate systems may include two axes that are perpendicular and lie within the plane of the cross-section (i.e., perpendicular to a longitudinal axis of the optical fiber).

At block 615, a spatial distribution of microstructures in the optical fiber may be characterized. For example, the positions and sizes or each identified microstructure may be determined. Determining positions and sizes may be achieved by fitting identifying elliptical shapes within the cross-sectional image and fitting the elliptical shapes to ellipses. Optionally, circular shapes may be used. The sizes of the shapes (diameter, radius, semi-major axis, or semi-minor axis, etc.) may be determined during characterizing the spatial distribution of microstructures.

At block 620, geometrical properties of the optical fiber are determined, such as by using the reference coordinate system and the spatial distribution of microstructures. Various techniques may be employed to determine various geometrical properties. For example, in some embodiments, second moments of area of the optical fiber with respect to the axes of the reference coordinate system may be determined. In embodiments, the second moments of area of the optical fiber may be determined by first determining the second moment of area of the periphery of the optical fiber with respect to the axes of the reference coordinate system and, using the parallel axis theorem, accounting for the contributions of each of the microstructures to the overall second moment of area with respect to the axes of the reference coordinate system. For microstructures representing holes in the optical fiber, this may amount to subtracting the contributions of each of the microstructures with respect to the axes of the reference coordinate system from the second moments of area determined using the periphery.

At block 625, the symmetry of the optical fiber is characterized, such as using the reference coordinate system, the spatial distribution of the microstructures, the geometrical properties, etc. For example, the symmetry of the optical fiber may be characterized by determining differences between semi-major and semi-minor axes of an ellipse fit to a periphery of the optical fiber. Alternatively or additionally, second moments of area may be compared with one another to characterize the symmetry.

Other aspects of the optical fiber may optionally be characterized or determined according to optical metrology techniques described herein. For example, in FIG. 6, at block 630 other characteristics of the optical fiber may optionally be determined, such as by using one or more of the spatial distribution of microstructures, the reference coordinate system, and derivative characteristics, for example. Useful characteristics include one or more vibrational frequencies of the optical fiber, such as along axes of the reference coordinate system, which may be determined using second moments of area, for example. Other useful characteristics include one or more natural frequency responses of the optical fiber, errors in the microstructured optical fiber, differences between natural frequency responses of the optical fiber, differences between determined vibrational frequencies of the optical fiber, differences between the natural frequency response and determined vibrational frequencies, etc.

At block 635, errors in the optical fiber may optionally be determined. Errors may include symmetry errors for the optical fiber, microstructure position errors, microstructure size errors, differences between vibrational frequencies and/or natural frequency responses, etc. Errors in microstructure positions and sizes may be identified by comparing sizes and positions of different microstructures and or comparing with statistical measures of sizes and positions and identifying particular microstructures having sizes or positions falling outside of a particular statistical level. For example, the microstructures may have a statistically narrow distribution of sizes and one or more microstructures may have sizes that fall outside of a standard deviation of the distribution, for example. Similarly, the microstructures may have a statistically narrow distribution of positions with respect to the reference coordinate system and one or more microstructures may have positions that fall outside of a standard deviation of the distribution, for example. In some embodiments, the identified positions may be compared with a predicted, ideal, or fixed array of positions and the deviations may correspond to differences from the predicted, ideal, or fixed array of positions. In some embodiments, extra or missing microstructures may be identified.

At block 640, the optical fiber may be determined to pass or fail a particular quality control metric. In some embodiments, a quality control metric may correspond to a particular threshold deviation from absolute symmetry. In some embodiments, a quality control metric may correspond to an absolute or fractional difference between the second moments of area. Optionally, a quality control metric may correspond to an absolute or fractional difference between computed or determined vibrational frequencies.

Features of the optical fiber and/or a preform used to make the optical fiber can be tracked. An image of the preform or a design for the preform may be obtained and optionally stored to a data store in association with a cross-sectional image of the optical fiber and/or characteristics identified for the optical fiber, including errors or quality control metrics. At block 645, method 600 optionally includes generating a preform design for a new optical fiber. Using information about the optical fiber and its preform or a design of the preform, a preform design for a new optical fiber can be generated or modified to better achieve particular quality control metrics in the new optical fiber. Machine learning, genetic algorithms, and other techniques may be useful for generating, modifying, and creating new preform designs. In some embodiments, a preform design, a predicted optical fiber cross-section, predicted optical fiber characteristics, a resultant optical fiber cross-sectional image (when available), and resultant optical fiber characteristics may be presented to a user or expert. The preform design may be modified for use in creating new optical fibers in an automated fashion, such as using machine learning, or manually by receiving user input.

Figure 7:
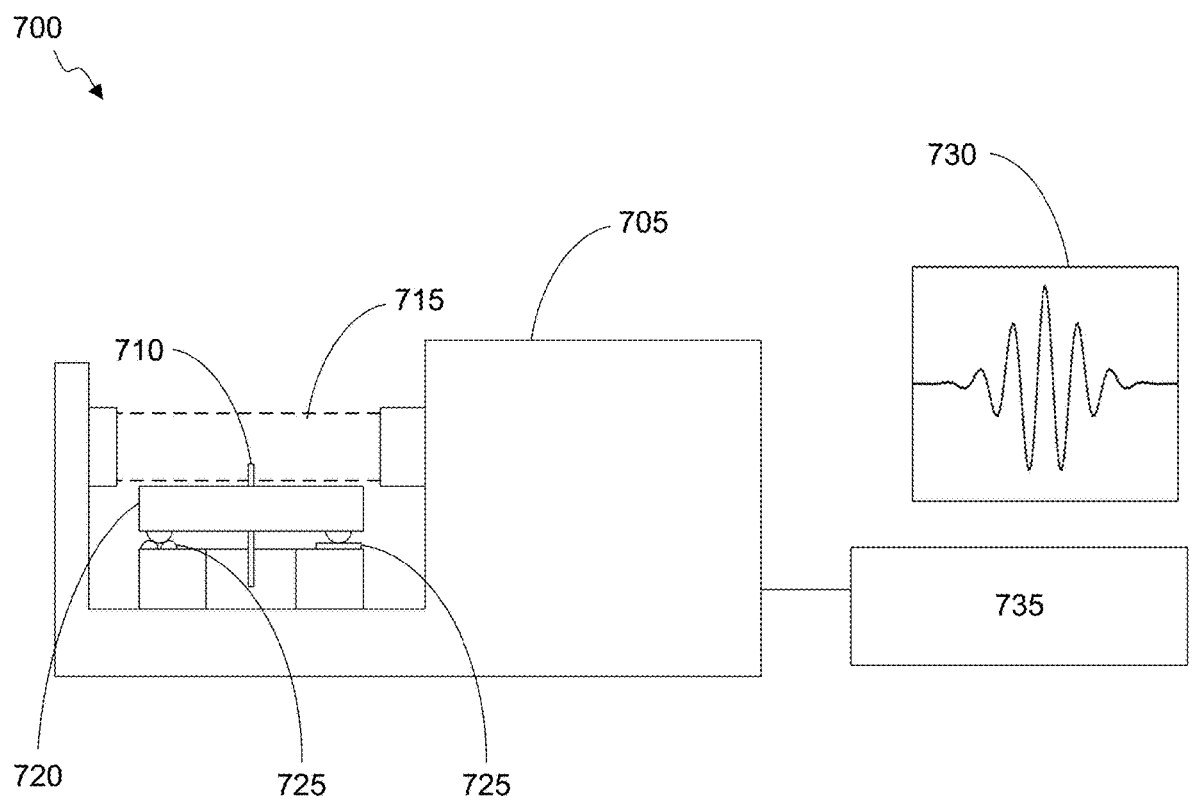
FIG. 7 provides a schematic illustration of a functional metrology systems, showing mounting of an optical fiber in an interferometer to obtain natural vibrational characteristics of the optical fiber.

As noted above, optical metrology techniques are useful for evaluating properties and characteristics of an optical fiber. For use of a fiber in a scanning fiber display, measurements of functional fiber behavior and characteristics may also be useful. FIG. 7 provides a schematic illustration of a system 700, such as an optical fiber system or a system for optically characterizing an optical fiber in accordance with aspects described herein. System 400 includes interferometer 705, with optical fiber 710 placed in a beam path 715 to obtain frequency measurements. System 700 also includes kinematic mount 720, for positioning optical fiber 710 in beam path 715. System 700 includes both kinematic mount 720 as well as corresponding mount points 725. Interferometer 705 may correspond to or otherwise include a digital device for obtaining a digital interferogram representative of a natural frequency response of the optical fiber 710 in response to an applied force. Optionally, a force may be applied by an automated mechanism of system 700. Optionally, optical fiber may be rotated to allow for application of the force at different directions with respect to an optical axis of the optical fiber.

An example of an interferogram 730 of a microstructured optical fiber is also illustrated in FIG. 7. Interferometer may optionally convert or transform the interferogram to frequency measurements corresponding to a frequency response of the optical fiber, such as along axes of a cross-section of the fiber. A computer 735, including a memory, non-transitory storage device, processor, etc., is positioned in data communication with interferometer 705 in order to allow functional metrology analysis. Computer 735, or a component thereof, may be programmed with and/or store instructions that, when executed by a processor, cause performance of operations corresponding to a functional metrology analysis. Optionally, computer 735 may convert or transform the interferogram to frequency measurements. Optionally, computer 735 may determine characteristics, errors, or other properties of optical fiber 710 as part of a functional metrology analysis.

Figure 8:
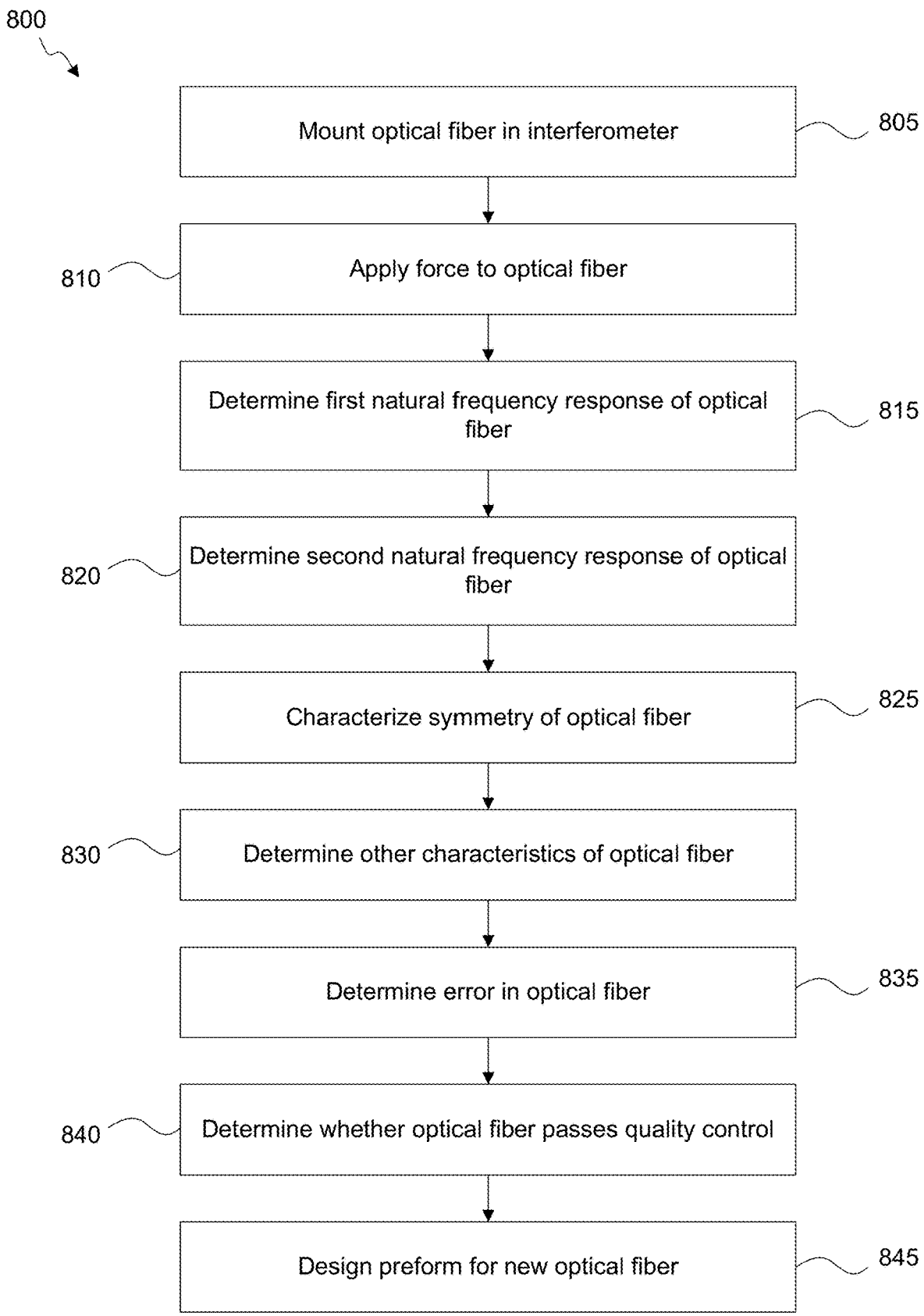
FIG. 8 provides an overview of a method for functionally characterizing an optical fiber.

FIG. 8 provides an overview of a method 800 of functionally characterizing an optical fiber, such as in accordance with a functional metrology technique. Optionally, the optical fiber is a microstructured optical fiber. At block 805, an optical fiber is mounted in an interferometer. As described above, the fiber may be mounted in a kinematic mount to allow for repeated measurements and/or transfer of optical fiber between instruments in a repeatable and known fashion. Use of kinematic mounts may be advantageous for allowing optical metrology and functional metrology measurements to be directly compared, as reference coordinate systems can be directly transferred if the orientation of the optical fiber within each respective instrument is held the same or is otherwise known.

At block 810 a force is applied to the optical fiber, such as to induce oscillations of the optical fiber. In some embodiments, a specific, calibrated, and/or repeatable force may be used, which may optionally be applied manually or automatically. In some embodiments, a specific force may not be applied, however the process of mounting the optical fiber in the interferometer at block 805 may include application of forces sufficient to induce oscillations to allow for functional metrology measurements to be obtained.

At blocks 815 and 820, first and second natural frequency responses of the optical fiber, such as along particular axes of a cross-section of the optical fiber, are obtained using the interferometer. Obtaining the natural frequency responses of the optical fiber may include using the interferometer to obtain an interferogram and transforming the interferogram to frequency measurements representative of the natural frequency responses. Obtaining the natural frequency responses may optionally include receiving the natural frequency responses, such as over a network or serial bus from a connected or remote device. As noted above, the interferometer may optically automatically transform the obtained interferogram to frequency measurements.

At block 825, the symmetry of the optical fiber is optionally characterized, such as by using the natural frequency responses of the optical fiber, a reference coordinate system, which may be obtained, for example, via optical metrology measurements, or other optical metrology characteristics, etc. For example, the symmetry of the optical fiber may be characterized by determining absolute differences or fractional differences between two natural frequency responses of the optical fiber.

Other aspects of the optical fiber may optionally be characterized or determined according to functional metrology techniques described herein. For example, in FIG. 8, at block 830 other characteristics of the optical fiber may optionally be determined, such as by using one or more of the natural frequency responses, the reference coordinate system, and derivative characteristics, for example. Useful characteristics include one or more of errors in the microstructured optical fiber, differences between natural frequency responses of the optical fiber, etc.

At block 835, errors in the optical fiber may optionally be determined. Errors may include symmetry errors for the optical fiber, differences between computed vibrational frequencies and/or natural frequency responses, etc.

At block 840, the optical fiber may be determined to pass or fail a particular quality control metric. In some embodiments, a quality control metric may correspond to a particular threshold deviation from absolute symmetry. In some embodiments, a quality control metric may correspond to an absolute or fractional difference between the natural frequency responses.

Features of the optical fiber and/or a preform used to make the optical fiber can optionally be tracked. An image of the preform or a design for the preform may be obtained and optionally stored to a data store in association with a cross-sectional image of the optical fiber and/or characteristics identified for the optical fiber, including natural frequency responses, errors, or quality control metrics. At block 845, method 800 optionally includes generating a preform design for a new optical fiber. Using information about the optical fiber and its preform or a design of the preform, a preform design for a new optical fiber can be generated or modified to better achieve particular quality control metrics in the new optical fiber. Machine learning, genetic algorithms, and other techniques may be useful for generating, modifying, and creating new preform designs. In some embodiments, a preform design, a predicted optical fiber cross-section, predicted optical fiber characteristics, such as predicted vibrational frequencies or natural frequency responses, a resultant optical fiber cross-sectional image (when available), and resultant optical fiber characteristics, such as natural frequency response may be presented to a user or expert. The preform design may be modified for use in creating new optical fibers in an automated fashion, such as using machine learning, or manually by receiving user input.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure. The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

A computing device may be incorporated as part of the previously described systems, such as systems 400 and 700. An example computing device comprises hardware elements that may be electrically coupled via a bus (or may otherwise be in communication). The hardware elements may include one or more processors, including without limitation one or more general-purpose processors and/or one or more special-purpose processors (such as digital signal processing chips, graphics acceleration processors, video decoders, and/or the like); one or more input devices, which may include without limitation a mouse, a touchscreen, keyboard, remote control, voice input, and/or the like; and one or more output devices, which may include without limitation a display device, a printer, speaker, etc.

The computing device may further include (and/or be in communication with) one or more non-transitory storage devices, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device might also include a communications subsystem, which may include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), a G.hn device, and/or the like. The communications subsystem may permit data to be exchanged with a network (such as the network described below, to name one example), other computer systems, and/or any other devices described herein. In many embodiments, the computing device will further comprise a working memory, which may include a RAM or ROM device, as described above.

The computing device also may comprise software elements, shown as being currently located within the working memory, including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the methods discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the non-transitory storage devices described above. In some cases, the storage medium might be incorporated within a computer system, such as the computing device described above. In other embodiments, the storage medium might be separate from a computer system (e.g., a removable medium, such as a compact disc, or a cloud- or network-based storage system), and/or provided in an installation package, such that the storage medium may be used to program, configure, and/or adapt a general purpose computer with the instructions/code stored thereon. These instructions might take the form of executable code, which is executable by the computing device or a component thereof and/or might take the form of source and/or installable code, which, upon compilation and/or installation on the computing device (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computing device to perform methods in accordance with various embodiments of the invention. According to a set of embodiments, some or all of the procedures of such methods are performed by the computing device in response to processor executing one or more sequences of one or more instructions (which might be incorporated into the operating system and/or other code, such as an application program) contained in the working memory. Such instructions may be read into the working memory from another computer-readable medium, such as one or more non-transitory storage devices. Merely by way of example, execution of the sequences of instructions contained in the working memory might cause the processor to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device, various computer-readable media might be involved in providing instructions/code to a processor for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as a non-transitory storage device. Volatile media include, without limitation, dynamic memory, such as the working memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device.

The communications subsystem (and/or components thereof) generally will receive signals, and the bus then might carry the signals (and/or the data, instructions, etc. carried by the signals) to the working memory, from which the processor retrieves and executes the instructions. The instructions received by the working memory may optionally be stored on a non-transitory storage device either before or after execution by the processor.

It should further be understood that the components of computing device may be distributed across a network. For example, some processing may be performed in one location using a first processor while other processing may be performed by another processor remote from the first processor. Other components of computing device may be similarly distributed. As such, a computing device may be interpreted as a distributed computing system that performs processing in multiple locations. In some instances, a computing device may be interpreted as a single computing device, such as a distinct laptop, desktop computer, or the like, depending on the context.

The invention may be further understood by reference to the following non-limiting examples.

Example 1: Optical Metrology of a Micro Structured Optical Fiber

This example describes a sample optical metrology technique for determining symmetry and other characteristics from a cross-sectional image of a microstructured optical fiber.

Vision and/or computer-based image processing techniques may be used to analyze a cross-sectional image of an optical fiber. As an overview, optical metrology techniques may include determining a best fit of an ellipse to an outer diameter or periphery of the optical fiber, which may provide a reference coordinate system and/or axes, determining a distribution of the microstructures in the optical fiber by locating hole centers and the sizes of holes, such as by fitting the holes to circles or ellipses. The second moments of areas of the optical fiber are then determined. Determination of the second moments of area for the optical fiber may include determining the second moments of area for the best fit ellipse and subtracting effects of the microstructures from the best fit ellipse second moments of area according to the parallel axis theorem. Optionally, the second moments of area may be used to determine vibrational frequencies along the axes of the reference coordinate system.

The following definitions are used in the optical metrology analysis of this example:

$I_S$: Second moment of area of cross-section for a solid optical fiber $I_{MS}$: Second moment of area of cross-section for a microstructured optical fiber $A_{S,MS}$: Area of cross-section of solid optical fiber, assumed constant over the optical fiber length $A_{S,MS}$: Area of cross-section of microstructured optical fiber, assumed constant over the optical fiber length $r_i$: radial distance to origin of reference coordinate system S: Subscript to indicate solid fiber
MS: Subscript to indicate microstructured fiber
i: Subscript to indicate microstructure element.

For an elliptical cross section with semi-major axis of length A aligned along the reference x-axis and semi-minor axis of length B aligned along the reference y-axis, the second moments of area are:

$$I_{xx\_S} = \frac{\pi A B^3}{4} \text{ and } I_{yy\_S} = \frac{\pi A^3 B}{4},$$

where $I_{xx\_S}$ is the second moment of area of the solid ellipse about the x-axis, $I_{yy\_S}$ is the second moment of area of the solid ellipse about the y-axis. In general the parallel axis theorem states that contributions of second moments of area may be summed as $I=I_{centroid}+A\cdot d^2$, where $I_{centroid}$ is a second moment of area of a first structure and A is the area of a particular section and d is the perpendicular distance of the section from the axis.

From the parallel axis theorem, the second moments of area for the micro-structured fiber are:

$$I_{xx\_MS} = I_{xx\_S} - \sum_{i=1}^{N}\left(\frac{\pi \cdot r_i^4}{4} + \pi \cdot r_i^2 \cdot y_i^2\right)$$

$$I_{yy\_MS} = I_{yy\_S} - \sum_{i=1}^{N}\left(\frac{\pi \cdot r_i^4}{4} + \pi \cdot r_i^2 \cdot x_i^2\right)$$

where $r_i$ is the radius of the $i^{th}$ hole, $x_i$ is the x location of the center of the $i^{th}$ hole, and $y_i$ is the y location of the center of the $i^{th}$ hole. Vibrational frequencies may be obtained using the second moments of area as described in, for example, U.S. Provisional Application No. 62/438,898, filed on Dec. 23, 2016, U.S. Provisional Application No. 62/464,298, filed on Mar. 27, 2017, U.S. Non-provisional application Ser. No. 15/851,330, filed on Dec. 21, 2017 and published under publication no. US 2018/0180875, and PCT International Application No. PCT/US2017/067973, filed on Dec. 21, 2017, all of which are hereby incorporated by reference in their entireties.

To illustrate this technique, the analysis was performed partial expanded view 500 of the cross-sectional image shown in FIG. 5. The microstructures were each fit to a circle (represented by analytical features 505) and their radii determined using visual image recognition techniques. The contributions to the second moments of area were summed, and subtracted from the second moments of area of the larger optical fiber. The optical fiber was fit to be elliptical with a nominal diameter of 125 µm, with the reference axes corresponding to the vertical and horizontal axes of the image shown in FIG. 5, with origin at the center of the image. The symmetry error was determined by obtaining the absolute difference between the second moments of area and dividing by the average of the second moments of area. The symmetry error was determined to be about 0.21%, representing a symmetry area close to a particular threshold of 0.2%, indicating that the fiber may not meet quality control metrics. It will be noted that some analytical feature 505 outliers were identified in FIG. 5 and not representative of actual microstructures, which may contribute to the overall error in the determined symmetry. Optionally, outliers may be automatically and/or manually removed to improve the overall analysis.

What is claimed is:

1. A system for optically characterizing an optical fiber, the system comprising:
   a microscope for obtaining a cross-sectional image of a microstructured optical fiber;
   a kinematic mount for positioning the microstructured optical fiber beneath a lens of the microscope; and
   one or more processors in data communication with the microscope, the one or more processors programmed with instructions that, when executed by the one or more processors, cause the one or more processors to perform operations including:
      determining a reference coordinate system using the cross-sectional image, wherein the reference coordinate system includes a first axis and a second axis;
      characterizing a spatial distribution of a plurality of microstructures within the microstructured optical fiber, wherein characterizing includes identifying positions and sizes of each microstructure;
      determining second moments of area of the microstructured optical fiber with respect to the first axis and the second axis, wherein determining the second moments of area includes using the spatial distribution of the plurality of microstructures; and
      characterizing a symmetry of the microstructured optical fiber using the second moments of area.

2. The system of claim 1, wherein the operations further include:
   determining a first vibrational frequency of the microstructured optical fiber with respect to the first axis using the second moments of area; and
   determining a second vibrational frequency of the microstructured optical fiber with respect to the second axis using the second moments of area.

3. The system of claim 1, further comprising:
   an interferometer in data communication with the one or more processors; and
   a second kinematic mount for positioning the microstructured optical fiber in a beam path of the interferometer;
   wherein the operations further include:
      determining a first natural frequency response of the microstructured optical fiber along the first axis using the interferometer; and
      determining a second natural frequency response of the microstructured optical fiber along the second axis using the interferometer.

4. The system of claim 1, wherein the operations further include one or more of:
   storing one or more characteristics or errors of the microstructured optical fiber to a data store in association with an identifier for the microstructured optical fiber;
   generating a notification providing one or more characteristics or errors of the microstructured optical fiber; and
   identifying the microstructured optical fiber as passing or failing a quality control metric based on one or more characteristics or errors of the microstructured optical fiber.

5. The system of claim 1, further comprising:
   an interferometer in data communication with the one or more processors;
   wherein the microstructured optical fiber is positioned in a beam path of the interferometer;

an actuator in mechanical contact with the microstructured optical fiber, the actuator configured to receive control signals and induce movement in the microstructured optical fiber in response thereto; and control circuitry in communication with the interferometer and the actuator, the control circuitry comprising the one or more processors, wherein the operations further include:

applying one or more control signals to the actuator to induce movement in the microstructured optical fiber;

obtaining one or more interferometric measurements of the microstructured optical fiber using the interferometer;

determining one or more mechanical characteristics of the microstructured optical fiber based on the one or more control signals and the one or more interferometric measurements;

evaluating the one or more mechanical characteristics of the microstructured optical fiber against a set of criteria; and performing one or more operations based on results of the evaluating.

6. The system of claim 5, wherein obtaining the one or more interferometric measurements of the microstructured optical fiber is performed during or after applying the one or more control signals to the actuator to induce movement in the microstructured optical fiber.

7. The system of claim 5, wherein applying the one or more control signals to the actuator includes applying a predetermined step function control signal to the actuator to induce movement in the microstructured optical fiber along a particular axis of a reference coordinate system, and wherein determining the one or more mechanical characteristics includes determining a natural frequency response of the microstructured optical fiber along the particular axis.

8. The system of claim 5, wherein applying the one or more control signals to the actuator includes applying the one or more control signals to the actuator to induce oscillation in the microstructured optical fiber at a particular frequency about or equal to a natural frequency of the microstructured optical fiber, and wherein performing the one or more operations based on results of the evaluating includes:

determining an adjusted frequency for oscillation of the microstructured optical fiber; and applying one or more control signals to the actuator to induce oscillation in the microstructured optical fiber at the adjusted frequency.

9. The system of claim 5, wherein evaluating the one or more mechanical characteristics includes performing a failure mode analysis on the microstructured optical fiber, and wherein performing the one or more operations based on results of the evaluating includes:

providing a notification for output through a user interface, the notification including a result of the failure mode analysis.

10. The system of claim 5, wherein the one or more interferometric measurements comprise an interferogram of the microstructured optical fiber, and wherein the operations further include:

transforming the interferogram to obtain frequency measurements corresponding to a natural frequency response of the microstructured optical fiber.

11. A method comprising:

obtaining a cross-sectional image of a microstructured optical fiber using a system comprising:

a microscope for obtaining the cross-sectional image of the microstructured optical fiber;

a kinematic mount for positioning the microstructured optical fiber beneath a lens of the microscope; and one or more processors in data communication with the microscope, the one or more processors programmed with instructions that, when executed by the one or more processors, cause the one or more processors to perform operations;

determining, using the one or more processors, a reference coordinate system using the cross-sectional image, wherein the reference coordinate system includes a first axis and a second axis;

characterizing, using the one or more processors, a spatial distribution of a plurality of microstructures within the microstructured optical fiber, wherein characterizing includes identifying positions and sizes of each microstructure;

determining, using the one or more processors, second moments of area of the microstructured optical fiber with respect to the first axis and the second axis, wherein determining the second moments of area includes using the spatial distribution of the plurality of microstructures; and characterizing, using the one or more processors, a symmetry of the microstructured optical fiber using the second moments of area.

12. The method of claim 11, further comprising:

mounting the microstructured optical fiber under a lens of a microscope, wherein the microscope is used to obtain the cross-sectional image.

13. The method of claim 11, wherein determining the reference coordinate system includes fitting a periphery of the microstructured optical fiber in the cross-sectional image to an elliptical shape.

14. The method of claim 11, further comprising:

designing or modifying a preform for a second microstructured optical fiber using one or more characteristics or errors of the microstructured optical fiber; and making the second microstructured optical fiber from the preform.

15. The method of claim 11, further comprising one or more of:

storing one or more characteristics or errors of the microstructured optical fiber to a data store in association with an identifier for the microstructured optical fiber;

generating a notification providing one or more characteristics or errors of the microstructured optical fiber; or identifying the microstructured optical fiber as passing or failing a quality control metric based on one or more characteristics or errors of the microstructured optical fiber.

16. The method of claim 11, further comprising:

mounting the microstructured optical fiber in the kinematic mount;

positioning the kinematic mount to place the microstructured optical fiber under the lens of the microscope;

positioning the kinematic mount to place the microstructured optical fiber in a beam path of an interferometer;

applying a force to the microstructured optical fiber to induce oscillation of the microstructured optical fiber along the first axis and the second axis;

determining a first natural frequency response of the microstructured optical fiber along the first axis using the interferometer; and determining a second natural frequency response of the microstructured optical fiber along the second axis using the interferometer.

17. The method of claim 11, further comprising:

mounting the microstructured optical fiber in an interferometer;

applying a force to the microstructured optical fiber to induce oscillation of the microstructured optical fiber along a first axis and a second axis;

determining a first natural frequency response of the microstructured optical fiber along the first axis using the interferometer; and determining a natural second frequency response of the microstructured optical fiber along the second axis using the interferometer.

18. The method of claim 17, wherein mounting the microstructured optical fiber includes mounting the microstructured optical fiber in the kinematic mount and positioning the kinematic mount to place the microstructured optical fiber in a beam path of the interferometer.

19. The method of claim 17, further comprising:

designing or modifying a preform for a second microstructured optical fiber using one or more characteristics of the microstructured optical fiber; and making a second microstructured optical fiber from the preform.

20. The method of claim 17, further comprising one or more of:

storing one or more characteristics of the microstructured optical fiber to a data store in association with an identifier for the microstructured optical fiber;

generating a notification providing the one or more characteristics of the microstructured optical fiber; or identifying the microstructured optical fiber as passing or failing a quality control metric based on the one or more characteristics of the microstructured optical fiber.

* * * * *